United States Patent Office 3,062,484
Patented Nov. 6, 1962

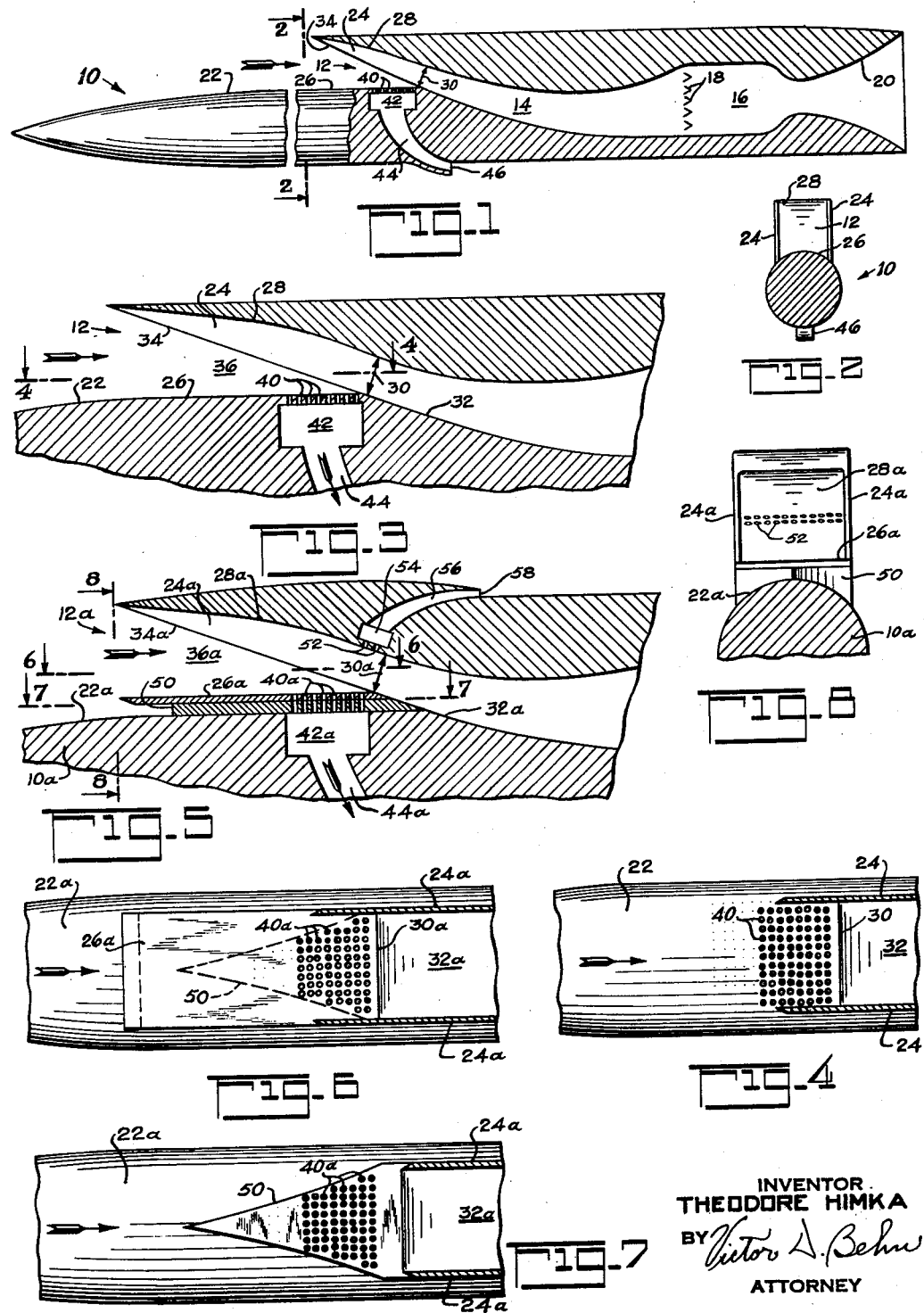

3,062,484
SUPERSONIC AIR INLET CONSTRUCTION
Theodore Himka, Lodi, N.J., assignor to Curtiss-Wright Corporation, a corporation of Delaware
Filed Apr. 10, 1953, Ser. No. 347,878
7 Claims. (Cl. 244—53)

This invention relates to fluid inlets designed for supersonic entering flow and is particularly directed to scoop-type air inlets for aircraft designed for supersonic flight. By a "scoop-type" air inlet for an aircraft is meant an air inlet which projects laterally from an aircraft surface with the entrance opening of said inlet directed forwardly or upstream into the surrounding air flow.

Jet engines for aircraft (including missiles) designed for supersonic flight require air inlets operating at supersonic air velocities to supply the required mass flow of air to the engine combustion chamber. For maximum pressure recovery such an inlet is provided with a restricted or throat portion downstream of its leading edge and when functioning properly at supersonic flight speeds the inlet air flow velocity upstream of the inlet throat is supersonic while downstream of said inlet throat the air flow velocity is subsonic. Initially, the air flow velocity is subsonic throughout the inlet. For the inlet to start after sonic flight speed is exceeded a normal or strong shock wave, which divides the supersonic flow from the subsonic flow, must move from the inlet entrance down to or through the inlet throat whereby the transition from supersonic flow to subsonic flow moves from the inlet entrance down to or beyond the inlet throat. The mass flow of air that will pass through the inlet throat will be greater in the started condition so that during inlet starting part of the air downstream of said normal or strong shock must spill outside the inlet.

Supersonic scoop-type inlets have been provided with swept-back side plates to permit spillage of air downstream of the normal or strong shock wave which moves down the inlet during starting of the inlet. This swept-back side plate construction provides a triangular air spillage opening in each side plate, each said opening having a maximum height at the inlet entrance. With such a scoop-type inlet construction it has been found that although the inlet may have sufficient spillage area downstream of the normal or strong wave to permit said shock wave to start moving down the inlet, said shock wave may reach a point where the inlet no longer has sufficient spillage area downstream of said shock wave. This is particularly so in the case of an inlet having low aspect ratio (ratio of inlet height to width) and/or having high contraction ratio (ratio of inlet height at entrance to inlet height at throat).

An object of the present invention comprises the provision of a modified scoop-type inlet having swept-back side plates and having increased spillage area without any substantial accompanying increase in the external aerodynamic drag of the inlet and so that the inlet will have efficient compression and will readily start notwithstanding a low aspect ratio and/or a high contraction ratio. In accordance with the present invention the inlet floor is constructed to provide for air spillage therethrough. More specifically at least the portion of the inlet floor adjacent to and upstream of the inlet throat is perforated for air spillage therethrough in addition to the air spillage provided by the swept-back inlet side plates.

Other objects of the invention will become apparent upon reading the annexed detailed description in connection with the drawing in which:

FIG. 1 is a schematic view of a ram jet engine having a scoop-type air inlet embodying the invention;

FIG. 2 is a view taken along lines 2—2 of FIG. 1;

FIG. 3 is an enlarged sectional view of the inlet of FIG. 1;

FIG. 4 is a view taken along lines 4—4 of FIG. 3;

FIG. 5 is a view similar to FIG. 3 but illustrating a modified construction; and FIGS. 6 and 7 are views taken along lines 6—6 and 7—7 respectively of FIG. 5.

Referring first to FIGS. 1 and 2 of the drawing, an aircraft, which may be a missile, is indicated partly in section by reference numeral 10. The power propulsion means of the aircraft 10 is illustrated as comprising a ram jet engine having a forwardly directed air inlet 12, an air inlet diffuser passage 14, a combustion chamber 16 having fuel supply and burner apparatus 18 and a rearwardly directed exhaust nozzle 20 through which the exhaust gases discharge to provide the aircraft with forward propulsive thrust.

The inlet 12 is a scoop-type inlet which projects laterally from a surface 22 of the aircraft 10. The details of the inlet are more clearly seen in the enlarged views of FIGS. 3 and 4.

The air inlet 12 is rectangular in cross-section and its flow path is formed by a pair of opposed side walls 24 an inner wall 26 comprising an extension of the aircraft surface 22 from which the inlet projects and an outer wall 28 opposite to the inner wall 26. As illustrated, the outer wall 28 is contoured similar to the profile of the nose of a conventional supersonic nose-type inlet comprising an annular cowl surrounding a forwardly projecting nose portion, the inlet throat being formed at 30. The portions 32 of the inner wall 26 downstream of the throat 30 preferably is contoured similar to the inner surface of the cowl in said conventional supersonic nose-type inlet. Each side plate 24 is cut or swept back from the leading edge of the outer wall 28 along a line 34 terminating at the inlet throat 30. At the designed flight speed of the aircraft 10 the line 34 coincides with an oblique shock wave within the inlet extending from the leading edge of the outer inlet wall 28. This swept back construction of each side plate 24 provides a triangular-shaped opening 36 in said side plate tapering downstream and terminating at the inlet throat 30.

The inlet 12, as so far described, is conventional. During starting of the inlet 12 a portion of the air downstream of the normal or strong shock wave entering the inlet spills out laterally through the side plate openings 36 to permit said shock wave to move down toward the inlet throat 30. If the spillage openings 36 are sufficiently large said shock wave will move down to or through the inlet throat whereupon the inlet is fully started. It has been found however that unless the aspect ratio (ratio of inlet height to width) of the inlet is sufficiently large, as the shock wave moves down the inlet a critical point is reached where the side wall openings 36 no longer provide sufficient spillage area downstream of said shock wave. When such is the case the inlet does not fully start in that the normal shock wave does not move all the way down to or through the inlet throat 30 as is required for optimum or design operation. As a result, the mass flow of air flowing through the inlet throat and the total pressure recovery are less than would be the case had the inlet fully started.

If the side plates are further cut back or are slotted downstream of the oblique shock wave 34 to increase the spillage openings 36 then, because of the higher pressures downstream of said oblique shock wave 34, there would be continual leakage through said increased spillage area after the inlet had started. This air spillage after the inlet has started results in a corresponding loss in air flow through the inlet throat and increases the external aerodynamic drag of the inlet.

In accordance with the present invention, the spillage area of the inlet is increased by providing air spillage perforations 40 through the inlet floor or inner wall 26. The entire inner wall 26 of the inlet may be so perforated or, as illustrated, the perforations 40 preferably are confined to that portion of said wall immediately upstream of the inlet throat where the side wall spillage areas 36 are not sufficient to permit further downstream starting movement of the inlet normal shock wave toward the inlet throat 30. A plenum chamber 42 is provided on the other side of the inlet wall 26 whereby the perforations 40 provide communication between the air inlet and said chamber. The chamber 42 is ducted by a passage 44 to free stream flow of the surrounding atmosphere at some point on the aircraft body spaced from the inlet 12. The passage 44 should terminate at a point on the surface of the aircraft body 10 where the pressure is sufficiently low to permit air spillage flow therethrough from the perforations 40 during inlet starting. Preferably, the discharge end of the passage 44 is disposed at a point where said spillage flow would be helpful aerodynamically for example in maintaining boundary layer flow over the adjacent surface portion of the aircraft or in minimizing the external drag attributable to the air pressure forces acting on the aircraft. In order to assist spillage flow through the perforations 40, the discharge passage 44 may, as illustrated, terminate in an ejector nozzle 46 projecting from the aircraft 10 and directed downstream relative to the surrounding air flow thereover. With this latter arrangement the ejector action of the surrounding free stream air flowing over the nozzle 46 helps to draw spillage air through the perforations 40.

After the inlet has fully started, the normal shock wave is disposed at or downstream of the throat 30 of the inlet so that free stream pressure exits in the inlet 12 upstream of said throat and upstream of the oblique shock wave 34. Accordingly after the inlet has started fully there will be little or no leakage through the perforations 40.

In FIGS. 1–4 no attempt has been made to remove the boundary layer of relatively slow moving air entering the inlet 12 adjacent to the aircraft surface 22 or to otherwise provide means to insure substantially uniform air velocity across the entrance to the inlet 12. FIGS. 5–7 illustrate a modification in which a boundary layer removal scoop has been added to the inlet. Except for the addition of said scoop the inlet of FIGS. 5–7 is identical with that of FIGS. 1–4 and like parts have been indicated by like reference numerals but with a subscript *a* added thereto.

In FIGS. 5–7 the inlet inner wall or floor 26a is spaced from the adjacent surface 22a of the aircraft 10a. Between the inlet floor 26a and the aircraft 10a there is provided a spike-type scoop 50 for taking the boundary layer of air flowing over the aircraft surface 22a and deflecting said air laterally from the scoop 12a. Also, as illustrated, the perforations 40a extend through the inlet floor 26a and through the spike of the scoop 50 to the plenum chamber 42a. Therefore the perforations 40a are confined to the dimensions of the scoop 50.

The inlet outer wall 28 (FIG. 1) is of considerable length so that a region of relatively slow moving air (boundary layer) builds up along the surface of this wall. This boundary layer, which gradually thickens as the flow progresses downstream along the wall, tends to cause flow detachment from the surface due to the adverse pressure gradient through the strong shock waves at the inlet region of the subsonic diffuser, that is in the region of the inlet throat. Any such flow detachment will tend to cause a loss in the overall pressure recovery of the inlet. The modification of 5–7 discloses means for removing this latter boundary layer along the surface of the wall 28a. For this purpose the surface of the wall 28a has been provided with a plurality of perforations 52 preferably immediately upstream of the inlet throat 30a and communicating with a chamber 54 within the inlet wall 28a. In addition or in lieu of the perforations 52 additional perforations may be provided in the surface of the wall 28a at or downstream of the throat 30a and communicating with the chamber 54. A passage 56 leads from the chamber 54 to a rearwardly directed nozzle 58. With this added structure of FIGS. 5–7, the relatively slow moving boundary layer of air flowing over the inlet surface of the wall 28a is removed upstream of the throat 30a by the perforations 52, said boundary layer bleeding through the perforations 52 into the chamber 54 and discharging from said chamber through the passage 56 and nozzle 58 into the surrounding atmosphere. The required amount of flow through the perforations 52 for removing said boundary layer is small compared to the flow required through the perforations 40a during inlet starting. Hence the flow area required of the perforations 52 is much less than that required of the perforations 40a. As in the case of the inlet 12, after the inlet 12a has started there may also be a small leakage flow through the perforations 40a which will tend to remove the boundary layer of air flowing along the surface 26a.

If the flow of the surrounding air stream over the discharge end of the passage 44a acts as an educer to draw air therethrough or if said passage discharges into a low pressure region there will also be a small leakage air flow through the perforations 40a after the inlet has started. A small amount of such flow is desirable after the inlet has started because it tends to remove the boundary layer of slow moving air along the inlet surface 26a. If desired the magnitude of this small leakage air flow through the perforations 40a after the inlet has started may be controlled by a suitable valve as for example by an external flap at the discharge end of the passage 44a. At this point it should be noted that after the inlet has started any leakage flow through the perforations 40a is much smaller than the leakage flow through said perforations during inlet starting because the pressure in the inlet at said perforations drops to that of the surrounding free stream after the inlet has started.

The inlet floor 26a is illustrated as being rectangular with its leading edge disposed upstream to the same extent as the leading edge of the outer wall 28. Actually however the inlet floor 26 may have other configurations. For example the inlet floor 26a may have a spike-type shape so that its profile coincides with that of the boundary layer removal spike 50.

In each of the modifications described, the percent open area provided by the perforations 40 or 40a and the minimum distance to which they extend upstream of the inlet throat depends on the inlet aspect ratio, the inlet contraction ratio and the flight speed for which the aircraft is designed. Thus more spillage area is required for an inlet of lower aspect ratio, higher contraction ratio and/or higher flight speed. If desired the perforations may extend over the entire floor area 26 in FIGS. 1–4 or over the entire portion of the floor area 26a in FIGS. 5–7 included within the profile of the boundary layer removal spike 50. Preferably, however, the perforations 40 or 40a extend upstream from the inlet throat only so far as to provide the extra air spillage necessary for inlet starting in order to minimize any air spillage therethrough after the inlet has started. In actual inlets which were successfully tested the inlet floor perforations provided the inlet floor with an open area equal to at least 50% of the floor area bounded by said perforations.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination with a body member of an aircraft designed for supersonic flight; a scoop-type air inlet projecting laterally from said body member with the wall of said inlet having a pair of opposed side portions and opposed inner and outer portions defining the flow path of said inlet and with said inlet having a throat portion disposed downstream of its leading edge, each side portion of said inlet wall being cut back from the leading edge of said outer portion of said inlet wall to provide a triangular air spillage opening in said side portion tapering toward and terminating substantially at said inlet throat portion, and said inner portion of the inlet wall having openings therethrough upstream of said throat portion to provide air spillage from said inlet through said latter openings during inlet starting.

2. In combination with a body member of an aircraft designed for supersonic flight; a scoop-type air inlet projecting laterally from said body member with the wall of said inlet having a pair of opposed side portions and opposed inner and outer portions defining the flow path of said inlet with said inlet having a throat portion disposed downstream of its leading edge, each side portion of said inlet wall being cut back from the leading edge of said outer portion of the inlet wall to provide a triangular air spillage opening in said side portion tapering toward and terminating substantially at said inlet throat portion, and said inner portion of the inlet wall having a plurality of perforations therethrough upstream of said throat portion; and means providing a chamber with said aircraft bdoy member communicating with said inlet through said perforations for air spillage therein during inlet starting.

3. In combination with a body member of an aircraft designed for supersonic flight; a scoop-type air inlet projecting laterally from said body member with the wall of said inlet having a pair of opposed side portions and opposed inner and outer portions defining the flow path of said inlet with said inlet having a throat portion disposed downstream of its leading edge, each side portion of said inlet wall being cut back from the leading edge of said outer portion of the inlet wall to provide a triangular air spillage opening in said side portion tapering toward and terminating substantially at said inlet throat portion, and said inner portion of the inlet wall having a plurality of perforations therethrough upstream of said throat portion, said perforations providing said inner portion with an open area equal to at least fifty percent of the wall area of said portion bounded by said perforations; and means providing a chamber with said aircraft body member communicating with said inlet through said perforations for air spillage therein during inlet starting.

4. In combination with a body member of an aircraft designed for supersonic flight; a scoop-type air inlet projecting laterally from said body member with the wall of said inlet having a pair of opposed side portions and opposed inner and outer portions defining the flow path of said inlet with said inlet having a throat portion disposed downstream of its leading edge, each said side portion of the inlet wall being cut back from the leading edge of said outer portion of the inlet wall to provide a triangular air spillage opening in said side portion tapering toward and terminating substantially at the inlet throat portion such that said side portion is cut back along a line which, at a particular flight speed, substantially coincides with the oblique shock wave extending from said leading edge into said inlet, and said inner portion of the inlet wall having openings therethrough to provide air spillage from said inlet through said openings during inlet starting.

5. In combination with a body member of an aircraft designed for supersonic flight; a scoop-type air inlet projecting laterally from said body member with the wall of said inlet having a pair of opposed side portions and opposed inner and outer portions defining the flow path of said inlet with said inlet having a throat portion disposed downstream of its leading edge, each said side portion of the inlet wall being cut back from the leading edge of said outer portion of the inlet wall to provide a triangular air spillage opening in said side portion tapering toward and terminating substantially at the inlet throat such that said side portion is cut back along a line which, at a particular flight speed, substantially coincides with the oblique shock wave extending from said leading edge into said inlet, said inner portion of the inlet wall having a plurality of perforations therethrough upstream of said throat portion; means providing a chamber within said aircraft body member communicating with said inlet through said perforations; and passage means providing communication between said chamber and the surrounding atmosphere for air spillage flow, during inlet starting, from said inlet through said perforations, chamber and passage means into the surrounding atmosphere.

6. In combination with a body member of an aircraft designed for supersonic flight; a scoop-type air inlet projecting laterally from said body member with the wall of said inlet having a pair of opposed side portions and opposed inner and outer portions defining the flow path of said inlet with said inlet having a throat portion disposed downstream of its leading edge, each side portion of said inlet wall being cut back from the leading edge of said outer portion of the inlet wall to provide a triangular air spillage opening in said side portion tapering toward and terminating substantially at said inlet throat portion and the leading edge of the inner portion of the inlet wall being spaced from the adjacent surface of the aircraft body member from which the inlet projects; an air deflection scoop member disposed between said inner portion and said aircraft body member surface for removing the boundary layer of air flowing over said aircraft body member surface toward the air inlet; said inner portion and said deflection scoop member having perforations therethrough, said perforations being confined within the profile of said air deflection scoop member; and means providing a chamber within said aircraft body member communicating with said inlet through said perforations for air spillage therein during inlet starting.

7. In combination with a body member of an aircraft designed for supersonic flight; a scoop-type air inlet projecting laterally from said body member with the wall of said inlet having a pair of opposed side portions and opposed inner and outer portions defining the flow path of said inlet with said inlet having a throat portion disposed downstream of its leading edge, each side portion of said inlet wall being cut back from the leading edge of said outer portion of the inlet wall to provide a triangular air spillage opening in said side portion tapering toward and terminating substantially at said inlet throat portion, and said inner portion of the inlet wall having air flow openings upstream of said inlet throat and said outer portion having air flow openings in the region of said inlet throat.

References Cited in the file of this patent

UNITED STATES PATENTS

| | | |
|---|---|---|
| 2,480,036 | Lloyd | Aug. 23, 1949 |
| 2,573,834 | Davidson | Nov. 6, 1951 |
| 2,589,994 | Leduc | Mar. 18, 1952 |
| 2,631,425 | Nordfors | Mar. 17, 1953 |

FOREIGN PATENTS

| | | |
|---|---|---|
| 579,758 | Great Britain | Aug. 14, 1946 |
| 50,033 | France | Nov. 10, 1939 |
| | (Addition to Pat. 779,655) | |